(12) United States Patent
Kuehnle

(10) Patent No.: US 6,392,218 B1
(45) Date of Patent: May 21, 2002

(54) VEHICLE RAIN SENSOR

(75) Inventor: Andreas U. Kuehnle, Villa Park, CA (US)

(73) Assignee: Iteris, Inc., Anaheim, CA (US)

( * ) Notice: Subject to any disclaimer, the term of this patent is extended or adjusted under 35 U.S.C. 154(b) by 0 days.

(21) Appl. No.: 09/545,715

(22) Filed: Apr. 7, 2000

(51) Int. Cl.⁷ .................................................. B60S 1/08
(52) U.S. Cl. .................................... 250/208.1; 318/483
(58) Field of Search ....................... 250/208.1; 280/734, 280/735; 348/148; 340/815.4; 318/483, 485

(56) References Cited

U.S. PATENT DOCUMENTS

| | | |
|---|---|---|
| 4,578,995 A | 4/1986 | Meyer |
| 4,584,508 A | 4/1986 | Kobayashi et al. |
| 4,603,316 A | 7/1986 | Kobayashi et al. |
| 4,703,237 A | 10/1987 | Hochstein |
| 4,827,198 A | 5/1989 | Mueller |
| 4,960,996 A | 10/1990 | Hochstein |
| 4,973,844 A | 11/1990 | O'Farrell et al. |
| 4,987,296 A | 1/1991 | Kajioka |
| 5,119,002 A | 6/1992 | Kato |
| 5,138,241 A | 8/1992 | Shimizu et al. |
| 5,293,105 A | 3/1994 | West, Jr. |
| 5,533,391 A | 7/1996 | Brade et al. |
| 5,598,146 A | 1/1997 | Schroder |
| 5,653,855 A | 8/1997 | Scherer et al. |
| 5,659,294 A | 8/1997 | Schroder |
| 5,663,542 A | 9/1997 | Kohr |
| 5,668,478 A | 9/1997 | Buschur |
| 5,780,719 A | 7/1998 | VanDam |
| 5,789,670 A | 8/1998 | Scherer et al. |
| 5,796,094 A | 8/1998 | Schofield et al. |
| 5,811,793 A | 9/1998 | Pientka |
| 5,821,863 A | 10/1998 | Schroder et al. |
| 5,900,821 A | 5/1999 | Petzold |
| 5,991,049 A | 11/1999 | Tanaka et al. |
| 6,020,704 A * | 2/2000 | Buschur ..................... 318/483 |
| 6,124,886 A | 9/2000 | DeLine et al. |
| 6,172,613 B1 | 1/2001 | DeLine et al. |
| 6,222,460 B1 * | 4/2001 | DeLine et al. ........... 340/815.4 |

FOREIGN PATENT DOCUMENTS

WO    WO 94/27262    11/1994

* cited by examiner

*Primary Examiner*—Stephone Allen
(74) *Attorney, Agent, or Firm*—Myers, Dawes & Andras LLP

(57) ABSTRACT

An apparatus and a method for detecting moisture, such as rain on a vehicle, wherein a sensor acquires an optical image from a region of interest and produces the data to a microprocessor, the microprocessor processes the acquired optical image and selects an algorithm to evaluate the acquired optical image in order to determine whether sufficient moisture exists on the vehicle to warrant action such as activating windshield wipers.

29 Claims, 6 Drawing Sheets

VEHICLE RAIN SENSOR

BACKGROUND OF THE INVENTION

1. Field of Invention

The present invention is directed to a method and apparatus for detecting moisture. In particular, the preferred embodiments of the present invention provide an optical sensor that can detect raindrops accumulated on a vehicle.

2. Description of Related Arts

In the field of rain sensors, several conventional methods of rain detection currently exist. One conventional method of rain detection is described in U.S. Pat. No. 4,578,995, in which a pair of spaced apart parallel conductive rods are mounted in a housing. The housing has an open slot, through which raindrops may fall and be directed to the area between the two electrodes. If sufficient water accumulates between the two electrodes so as to form a conductive path, an electrical circuit is completed and rain is detected. One disadvantage associated with this type of rain detection method is that during light rain, there may not be sufficient amount of rainfall to form a conductive path between the electrodes.

Another conventional method of rain detection, disclosed in U.S. Pat. No. 4,584,508, consists of a rain sensor that includes a vibrator, the outer surface of which is exposed to potential raindrops. Upon experiencing rain drops on the outer surface, the vibrator oscillates at an amplitude and frequency corresponding to the energy applied by the raindrops. The rain sensor is adapted to produce rain condition indicative signals corresponding to the oscillation amplitude of the vibrator. One major disadvantage associated with this type of system is that the outer surface of the vibrator must be sufficiently large to "catch" raindrops, making the detector unsightly. Another disadvantage associated with this detection method is that light rain or mist may not contain raindrops with enough mass to cause sufficient impact on the vibrator to be detected.

U.S. Pat. No. 4,987,296 discloses another type of conventional rain detection method whereby a light beam is projected from a transmitter to a detector, the light beam being exposed to open air. When a raindrop falls into the path of the light beam, the light beam becomes, to some extent, obstructed, signaling the presence of rain. A major disadvantage associated with this method is the possibility of other weather elements, such as dust that may fall into the path of the light beam, causing erroneous detection of rain.

SUMMARY OF THE INVENTION

The present invention overcomes the disadvantages of the prior art by analyzing optical images to detect moisture on a surface such as a windshield of an automobile. More specifically, the present invention provides a sensor that can be mounted on a vehicle, such as the windshield of the vehicle. The sensor includes an optical image detector and a microprocessor with supporting control circuitry. The optical image detector acquires two-dimensional optical images from either the vehicle itself or an area surrounding the vehicle (e.g., the road ahead of the vehicle). The acquired optical images are then delivered to the microprocessor, which analyzes the image to determine whether moisture (such as rain) exists on the vehicle. Upon detection of sufficient moisture on the vehicle, the microprocessor circuitry can determine and cause the appropriate course of action such as activating windshield wipers by sending a signal to the vehicle windshield wiper control circuitry.

As indicated above, an application of the present invention is providing feedback to a the windshield wiper control circuitry of a vehicle. In a conventional vehicle with windshield wiper controls, a user can choose to activate and operate the windshield wipers on a periodic or intermittent basis. For instance, the user may adjust the settings of the windshield wiper controls such that the wipers are activated once every thirty seconds. The intermittent control function may also be speed dependent (i.e., the intermittent intervals may shorten as the vehicle increases in speed). In a typical rainstorm, the user normally adjusts the interval settings to shorter periods of time between windshield wiper activation if the rainfall becomes heavier, and adjusts the interval settings to longer periods of time between windshield wiper activation if the rainfall lightens.

In contrast, the present invention may provide feedback signals that can automatically adjust the windshield wiping functions based on the amount of moisture detected on the windshield. Hence, rather than the user guessing an appropriate time interval for the windshield wiper settings or having to adjust the interval settings in the event precipitation level changes, the present invention activates the windshield wipers whenever sufficient moisture on the windshield accumulates. Hence, an advantage of the present invention is to provide a more functional and accurate intermittent windshield wiper control that also relieves the user of the burden of constantly adjusting the windshield wiper settings as the amount of precipitation varies. It is noted that the present invention may also have application in controlling other application such as headlight or window wipers.

DETAILED DESCRIPTION OF PREFERRED EMBODIMENTS

Figure 1:
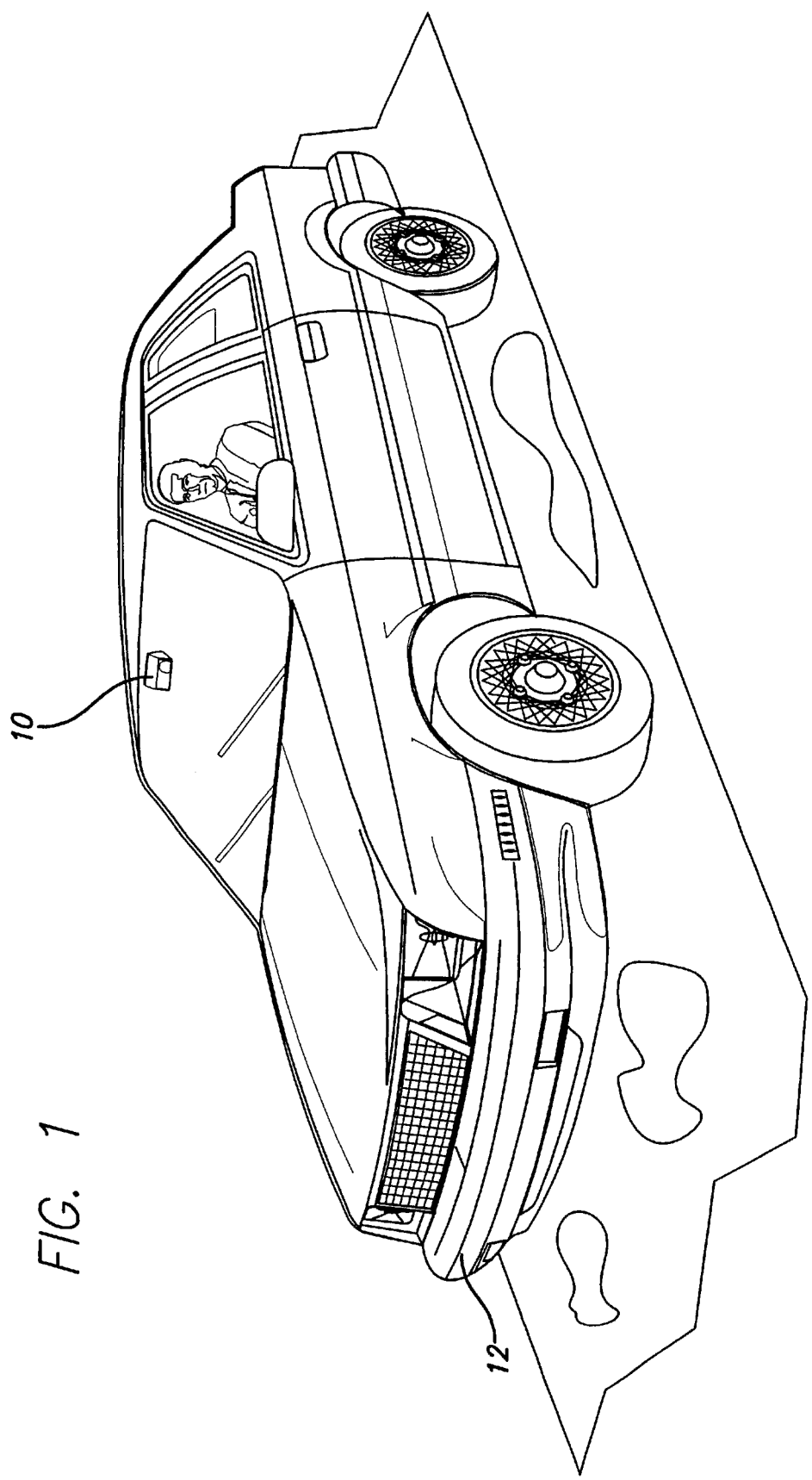
FIG. 1 is a perspective view of a rain sensor in accordance with an embodiment of the present invention, installed on a vehicle.

Preferred embodiments of the present invention will now be described with reference to FIGS. 1–8. It should be appreciated that the reference numerals are used to identify like elements illustrated in one or more of the figures.

Referring to FIG. 1, a sensor 10 in accordance with an embodiment of the present invention is illustrated that in may be installed on vehicles of various types such as an automobile 12. The sensor 10 is preferably mounted near the inside of the vehicle windshield. It is preferable that the sensor 10 be installed on the upper, inner portion of the windshield, with the optical detector pointed down toward the hood of the automobile 12.

Figure 2:
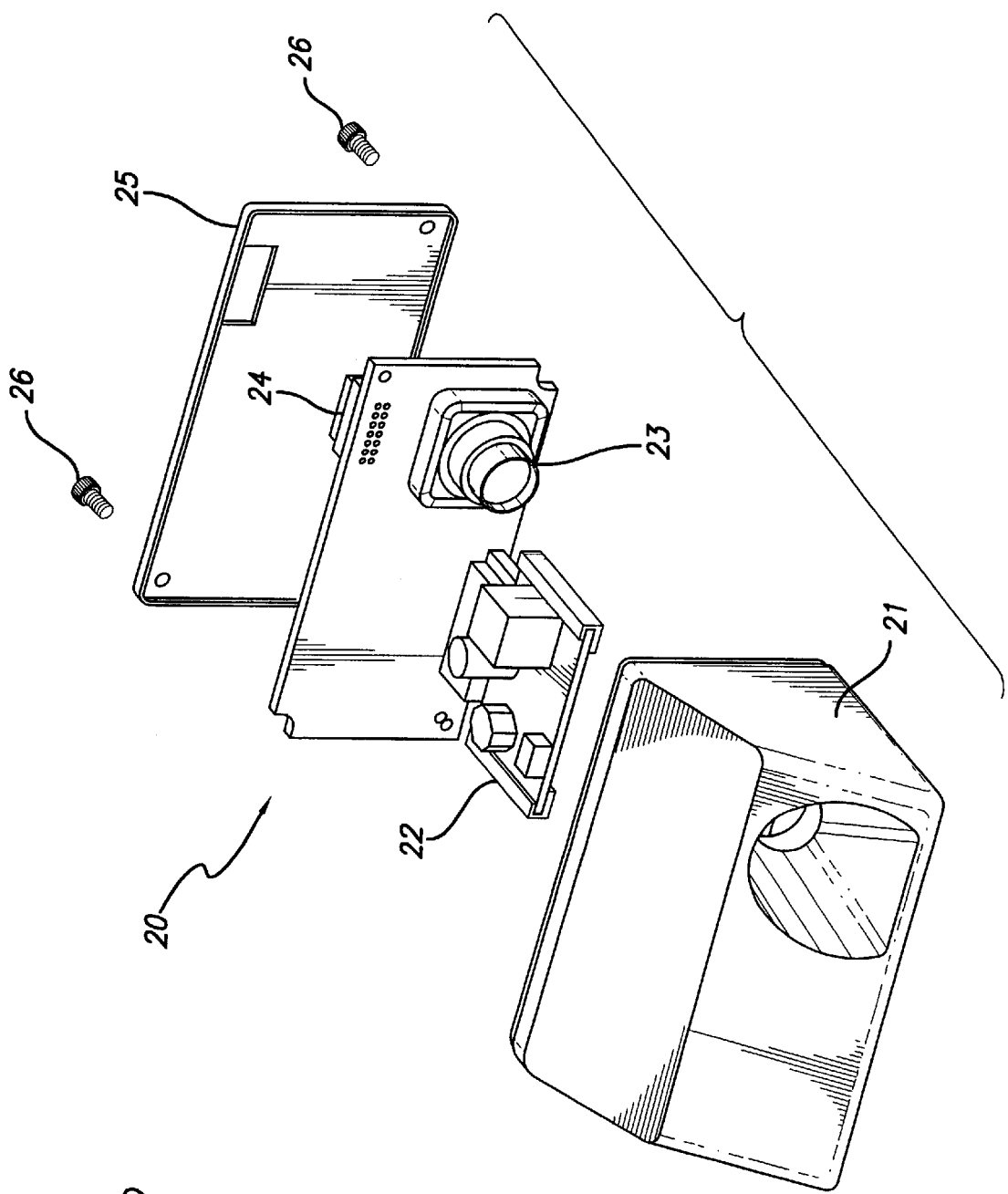
FIG. 2 is an assembly view of a rain sensor in accordance with an embodiment of the present invention.
Figure 3:
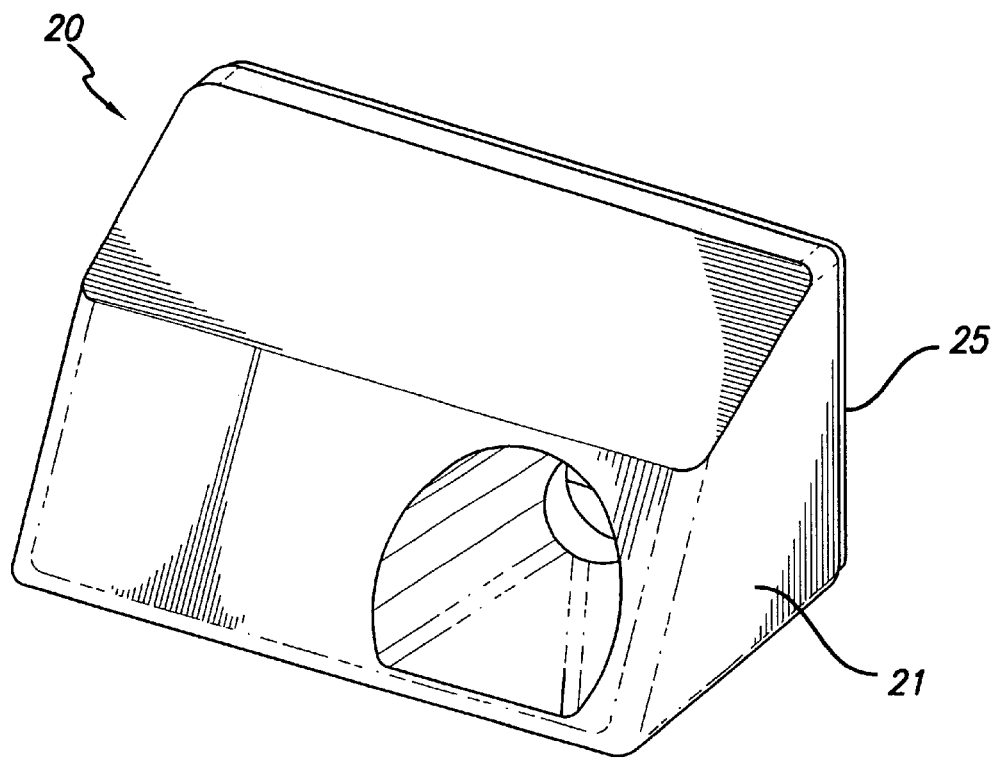
FIG. 3 is a front perspective view of a rain sensor in accordance with an embodiment of the present invention.
Figure 4:
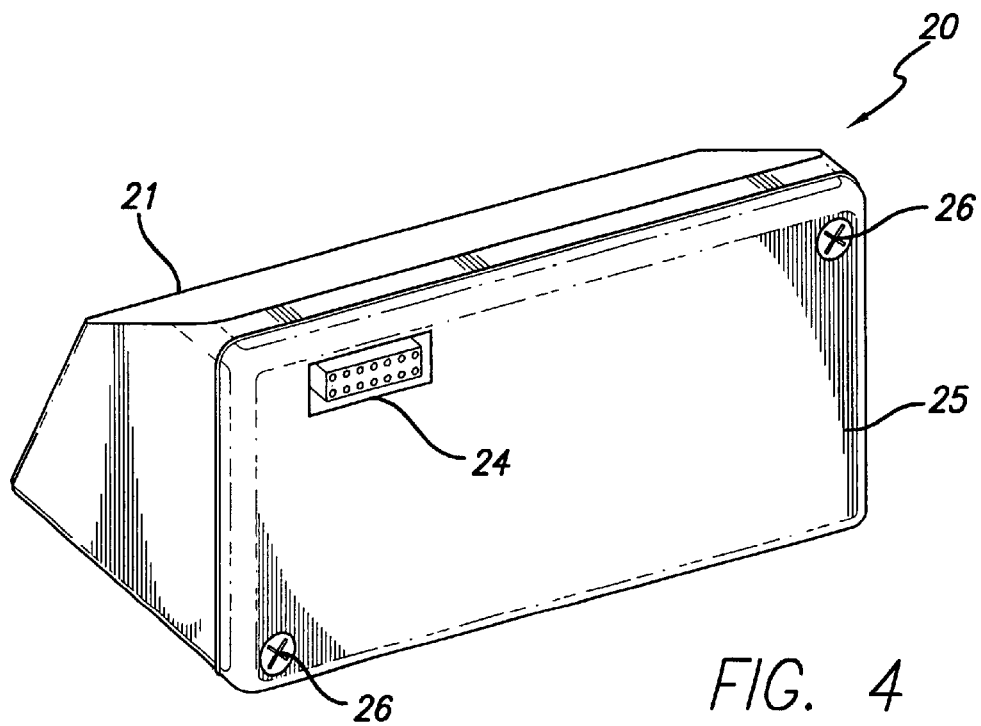
FIG. 4 is a back perspective view a rain sensor in accordance with an embodiment of the present invention.

FIG. 2 is an assembly view of a sensor 20 in accordance with an embodiment of the present invention. A microprocessor with support control circuitry ("microprocessor circuitry") 22 and optical detector 23 are enclosed by a front housing member 21 and a back housing member 25 that are secured together by screws 26. The optical detector 23 may be any of various types of optical image detector such as an analog or digital camera, video camera, or any charged coupled device ("CCD") array that can capture optical images. The optical detector 23 is connected to the microprocessor circuitry, which preferably includes a microprocessor, supporting memory devices, and logic devices (such as a frame grabber) that can digitize, transfer, and process video or optical image frames. A communication bus 24 protrudes preferably from the back housing member 25 and can be connected to a communication bus of another device. An equivalent of the communication bus 24 can be a wireless transmission device capable of transmitting signals to a wireless receiver in the automobile 12.

Figure 5:
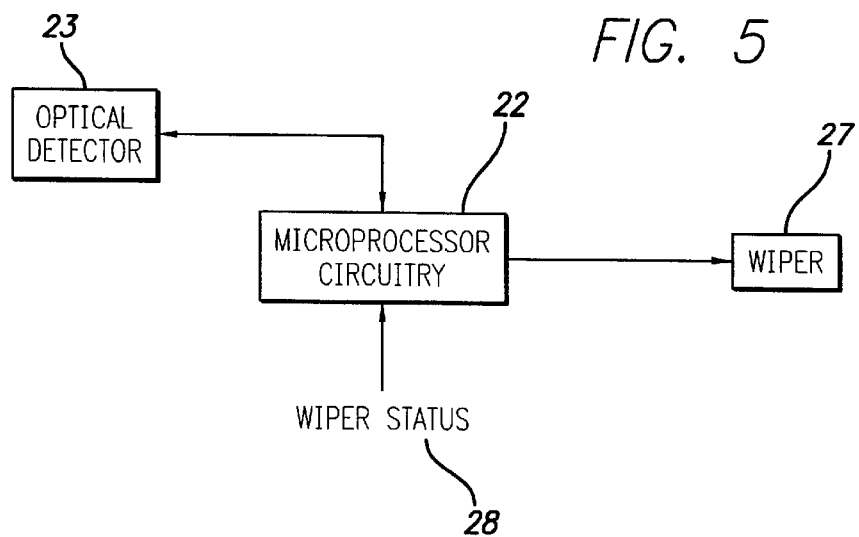
FIG. 5 is a block schematic diagram of the electronics in a rain sensor in accordance with an embodiment of the present invention.

According to a preferred embodiment of the present invention, the sensor 20 detects moisture on the vehicle preferably by first acquiring a two-dimensional optical image array using the optical detector 23. As shown in FIG. 5, the acquired optical image data is then transmitted from the optical detector 23 to the microprocessor circuitry 22 (via either a communication bus or wireless transmission), which then processes and analyzes the optical image data according to software instructions. In accordance with one embodiment of the present invention, the microprocessor circuitry 22 may also receive data input from the vehicle itself, including data such as status 28 of the windshield wipers 11 of the automobile 12 (e.g., activated or at rest). Upon analyzing the acquired optical image data, and upon processing any data inputted from the vehicle, the microprocessor 22 determines whether additional data is needed and if so cause the optical detector 23 to acquire and transmit additional optical image data. Alternatively, if the microprocessor circuitry 22 determines that sufficient data has been acquired, then the microprocessor circuitry 22 further analyzes the acquired optical data to determine whether moisture exists on the automobile 12. Upon determination of sufficient moisture on the vehicle, the microprocessor circuitry 22 may cause action to be taken such as activating the windshield wipers 11.

Figure 6:
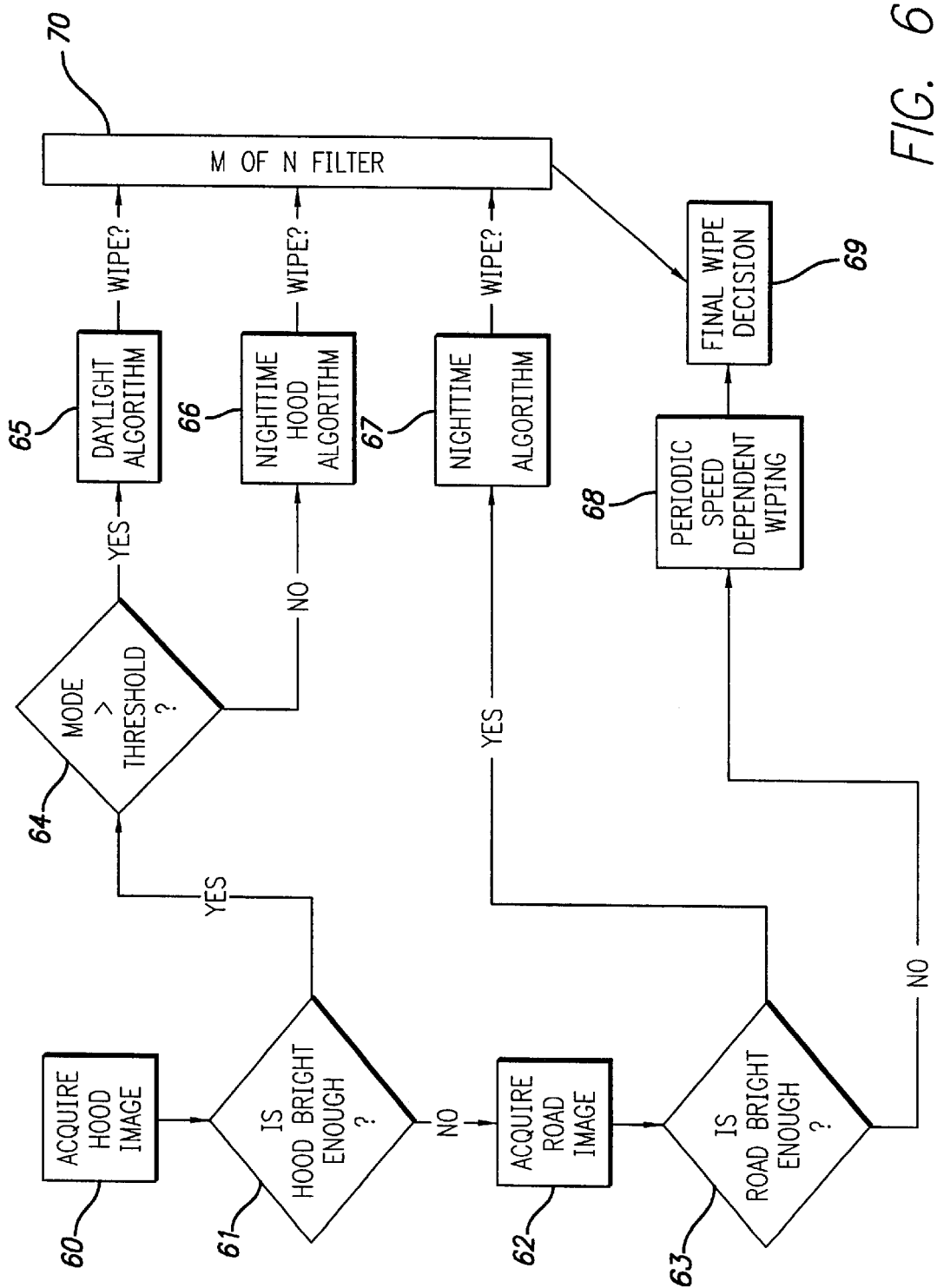
FIG. 6 is a flowchart illustrating moisture detection logic for a rain sensor in accordance with an embodiment of the present invention.

FIG. 6 is a flowchart illustrating in detail the logic steps applied by the microprocessor circuitry 22. As previously mentioned, in accordance with an embodiment of the present invention, the sensor 20 acquires two-dimensional optical images by using the optical detector 23. The optical detector 23 acquires optical images from a region of interest ("ROI"), which may include either a portion of the vehicle (e.g., the hood of an automobile) or a portion of the road ahead of the automobile 12. As shown in FIG. 6, step 60 acquires the initial optical image from the hood of a vehicle. If the initial optical image acquired is determined in step 61 to be sufficiently bright, indicating bright ambient light surrounding the vehicle, then the sensor preferably directs the optical detector to acquire future optical images from the hood of the vehicle. On the other hand, if the ambient light is not sufficiently bright to render a bright optical image, then in step 62 the optical detector 23 is preferably directed to acquire subsequent optical images from the road ahead of the vehicle. For vehicles without a front portion or a hood, the sensor acquires all images from the road ahead.

Whether the ambient light is sufficiently bright can be determined by using a simple brightness measurement, whereby the microprocessor circuitry 22 analyzes the individual pixels of the acquired optical image to derive a image brightness mean value. Typically, the range of brightness for a given pixel is between 0 to 255, 0 being completely dark and 255 being full scale brightness. A user may pre-select a threshold image brightness mean value, such as a value of 100, to be used for determining the brightness of the ambient lighting. For instance, optical images with an image brightness mean value above 100 indicates that the ambient light is sufficiently bright, and the ROI selected is the hood. Optical images with image brightness mean values below 100 indicate that the ambient lights are not sufficiently bright to use the hood as ROI, which is then switched to the road ahead of the vehicle. Typically, during dusk or nighttime, the road ahead of the vehicle is illuminated by the vehicle's headlights, and is hence brighter than the hood of the vehicle itself.

Once the windshield wipers are activated and an optical image is acquired from a selected ROI, the optical image is then processed by the microprocessor circuitry 22 of the sensor 20. In a preferred embodiment of the present invention, the microprocessor circuitry 22 may choose one of three alternative algorithms to evaluate the acquired optical image. The microprocessor selects the appropriate algorithm depending on the brightness of ambient light surrounding the vehicle and the type of light surrounding the vehicle. More particularly, if the ambient light surrounding the vehicle is bright daylight, the microprocessor 22 selects a daylight algorithm 65 to process the optical data. On the other hand, if the ambient light is bright artificial lights (e.g., driving at night under city street lights), then the microprocessor 22 selects a nighttime hood algorithm 66. If the ambient light is classified to be nighttime without bright artificial lights, then the microprocessor selects a nighttime algorithm 67 to process the optical data. Finally, if the ambient light is too dim to yield meaningful optical data for processing, then the microprocessor 22 activates a periodic speed dependent wiping 68, which may be the conventional intermittent wiper control with set intervals.

The brightness of ambient light conditions is determined by first evaluating the image brightness mean value as described in step 61. If the image brightness value is less than the threshold value of, for example, 100, then the condition is classified as nighttime and the microprocessor will choose to use the nighttime algorithm 67. If the image brightness value is classified as bright ambient light in step 61, then the ambient light condition may be further classified as either daylight or nighttime with artificial lights. If the conditions are determined to be daylight, then the microprocessor will select the daylight algorithm 65 to process the optical data from the hood. If on the other hand the light condition is classified as nighttime with artificial lights, then the microprocessor will select the nighttime hood algorithm 66 to process the optical data.

The distinction between daylight and nighttime with artificial lights is made in decision block 64, in which the microprocessor circuitry 22 evaluates the brightness histogram of the acquired images. Two quantities are evaluated from the brightness histogram: the average brightness value and the maximum brightness value. If the histogram maximum is above a threshold value of, for instance, 100, and the mean value is also above this threshold, then the ambient lighting condition is natural daylight (i.e., daylight). If the value of the histogram maximum is below 100, but the mean is above the threshold, then the illumination is classified as nighttime with artificial lights. As previously mentioned, if the ambient lighting condition is determined to be nighttime with reflections, then the sensor will employ the nighttime hood algorithm 66 to evaluate the acquired optical image. If on the other hand, the lighting condition is determined to be daylight, then the microprocessor circuitry will select the daylight algorithm 65 to evaluate the acquired optical image.

In a preferred embodiment of the present invention, the sensor may apply a M of N rule in decision block 70 as an additional logical step in the determination of whether to activate windshield wipers. Specifically, the rule is a time based decision logic that stipulates: if M of the last N (M and N being integers) acquired optical images have resulted in the determination of a wet ROI and activation of the windshield wipers, then the current determination is also to activate windshield wipers. This additional logical step eliminates brief spurious activation of windshield wipers. In one aspect of this embodiment, the M of N logical step is activated only after N optical images have been acquired and processed.

Figure 7:
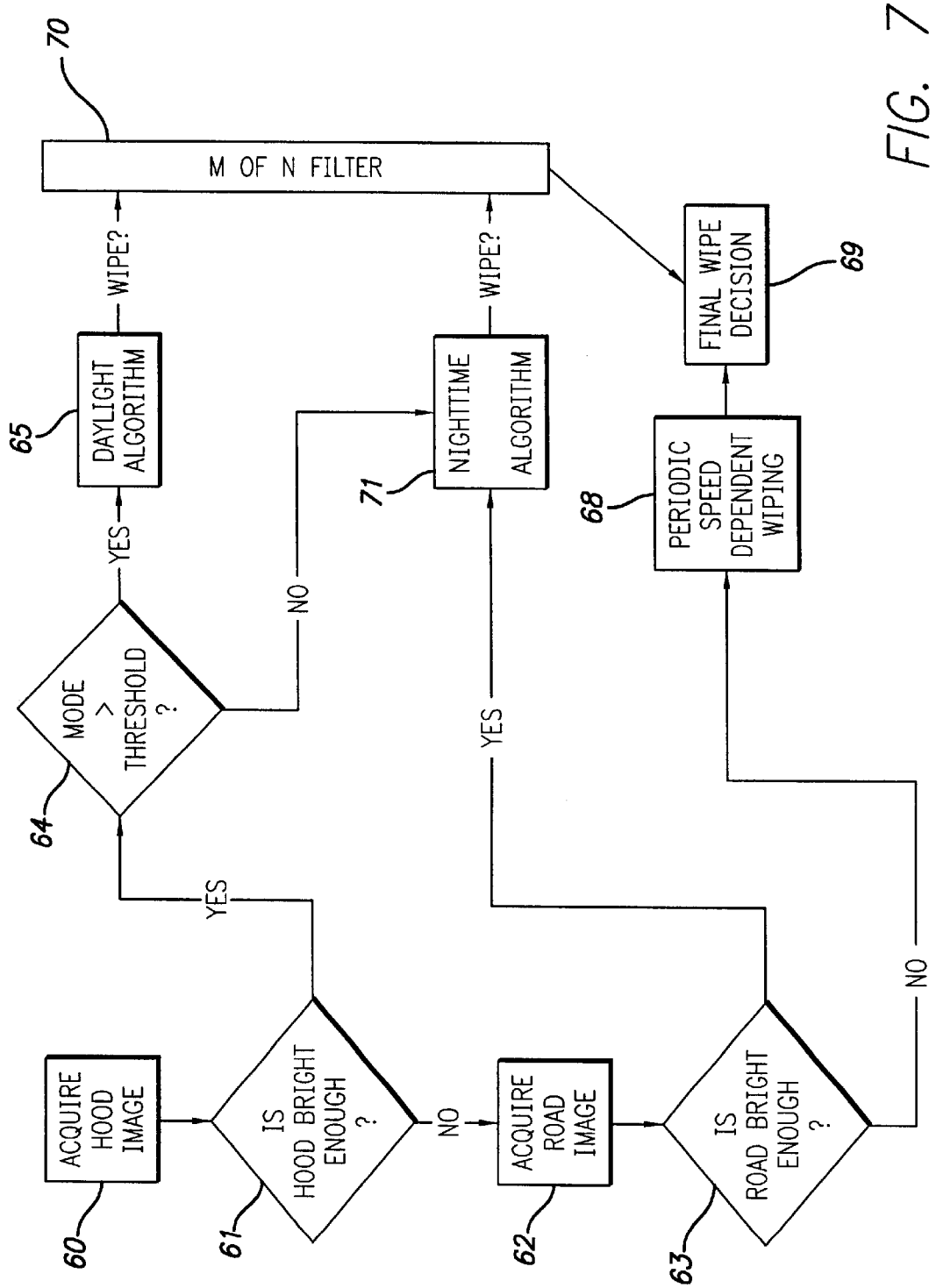
FIG. 7 is a flowchart illustrating moisture detection logic for a rain sensor in accordance with a second embodiment of the present invention.

In accordance with a second embodiment of the present invention, the microprocessor 22 selects from among only two different algorithms: the daylight algorithm 65 and the nighttime algorithm 67, which are described above. FIG. 7 is a flowchart illustrating the logic using only these two algorithms. The optical image data acquired from lighting conditions classified as daytime is processed by the daylight algorithm 65. Optical images acquired from lighting conditions determined to be nighttime without artificial lights are processed by the nighttime algorithm 67, as in the preferred embodiment. Unlike the prior embodiment, however, optical data acquired from lighting conditions determined to be nighttime with artificial lights are also processed by the nighttime algorithm 67 rather than nighttime hood algorithm 66.

The different types of algorithms will now be discussed. The nighttime algorithm 67 evaluates the acquired optical image data by measuring the average value of the square of the differences between adjacent pixels of the acquired optical image. Optical images acquired from wet surfaces tend to have a greater average value of the square of the differences. An average squared difference value between pixels of approximately 15 to 25 generally separates the wet from dry images and can be used as a threshold value for determining whether windshield wipers should be activated. In accordance with an embodiment of the present invention, a threshold value of approximately 22 may be selected for optical separation between wet and dry images.

The nighttime hood algorithm 66, used to evaluate optical data acquired from nighttime conditions with artificial lights, first divides the acquired optical images preferably into four sections. For each section, the brightness value of each pixel is measured, and the sum of the squares of each brightness value is calculated. The microprocessor 22 will compare the four sum values, and apply the nighttime algorithm to the section with the lowest sum of the squares value. In accordance with other embodiments of the present invention, the optical image may be divided into as few as two sections or as many as twelve sections.

Finally, the daylight algorithm 65 evaluates the acquired optical image data by making two measurements. One measurement is the average value of squared adjacent pixel differences as used in the nighttime algorithm described above. Typically, the average value of a squared difference will range between 0 and 30. The other measurement is the average image complexity of each pixel. The image complexity of each pixel is typically determined by measuring the approximate bandwidth of a signal or by measuring the amount of bit information of a pixel. Typically, the average value of image complexity ranges approximately between 0 and 2. Using the relationship between the two measurements of average value of squared pixel differences and average image complexity, a determination can be made as to whether the optical image was acquired form a wet or dry surface. In accordance with an embodiment of the invention, an optical image is determined to be acquired from a wet surface if the image complexity is greater than the value of 2−¼ (average squared difference). In other words, the optical image is considered "wet" if the inequality function of [image complexity >2−¼ (average squared difference)] is satisfied. The designer may increase or decrease the sensitivity of the rain sensor by adjusting the value of the constant (set as 2 in the above described equation). The lower the value of the constant, the more sensitive the sensor will be to moisture on the windshield, and vice versa. In accordance to one embodiment of the present invention, the value of the constant may be adjusted by the user (such as a driver of the automobile 12).

Other embodiments of the present invention may use algorithms that employ a combination of different measurements of the pixels to aid in the determination of moisture. These measurements include the correlation of adjacent pixels, the contrast of gray scale levels within the optical image, the brightness dispersion of the optical image, color variance and its spread over known uniform areas (rain is generally uniformly spread, on the average, over the windshield), the average strength of edges in the image, the standardized block pixel variance, the block pixel variation, and run length statistics of bright spots in the image. All of these measurements can help detect aberrations in an optical image that are caused by moisture or raindrops. A designer may select any one or a combination of those measurements to process an optical image to determine moisture on the vehicle. In using a combination of these measurements, the designer may use an AND logic, OR logic, or k-nearest neighbor logic to assess the significance of the contribution by each measurement. A k-nearest neighbor logic functions as follows:

1. Store a table of measurements from wet (need to wipe) and dry (don't wipe) images.
2. Find how close or similar (various proximity measurements are possible) a new unknown image is to these known measurements.
3. If a majority of the first k closest (k is a number) measurements are dry, then the unknown image is also dry, if a majority is wet, then the unknown image is wet. Sensitivity may be adjusted by requiring more or less than a simple majority.

This logic essentially compares the measurements from an unknown image with the measurements of known images. The closest or most similar reference measurements determine whether to wipe or not. An alternative approach is to use a neural network to classify the measurements as coming from a wet (need to wipe) or dry (do not need to wipe) windshield, with the sensitivity being determined by the threshold set for the output neuron(s).

The rain or moisture sensor can also function by detecting the partial obscuration or distortion of previously visible image structures. In particular, given a fixed structure on the front portion of a vehicle, a sensor can detect the decrease in correlation between an optical image acquired from a reference dry surface and an optical image acquired form a wet surface. An increase of moisture on the ROI manifests itself as a lowering correlation between the reference dry surface and the wet surface. Reference dry images are preferably periodically acquired during periods of not wiping to allow for dirt on the windshield.

In another aspect of the present invention, the degeneration of a formerly uniform area increases as the amount of obscuring rain increases. As rainfall increases, so does the average gradient in the image, shifting the maximum of the gradient histogram to higher values. As a result, the sensor can detect the amount of moisture on the vehicle by measuring the closeness of the image gradient histogram to reference wet and dry gradient histograms. Alternatively, the autocorrelation between neighboring pixels decreases as rain collects on the vehicle, and a sufficiently low value of autocorrelation indicates a need to activate the windshield wipers.

In accordance with another embodiment of the present invention, the operating conditions of the sensor are affected by two additional factors. Theses two factors include the speed of the vehicle and the status of the windshield wipers. The data is preferably detected by the vehicle itself and communicated to the sensor via the communication bus 4.

In accordance with another embodiment of the present invention, the image processing of the sensor is preferably automatically disrupted if a windshield wiper is physically moving across the windshield. Specifically, optical images acquired by the optical detector during the movement of a windshield wiper are preferably ignored, and image processing resumes preferably when the windshield wiper is returned to a resting position. However, the exposure control values for the acquired images are preferably updated without interruption to ensure that no abrupt changes in exposure will be required for future images with drastically different lighting conditions. Other embodiments of the present invention may simply ignore the portion of an optical image that is occluded by a windshield wiper, while still processing portions of the acquired image that are not occluded by a windshield wiper.

Figure 8:
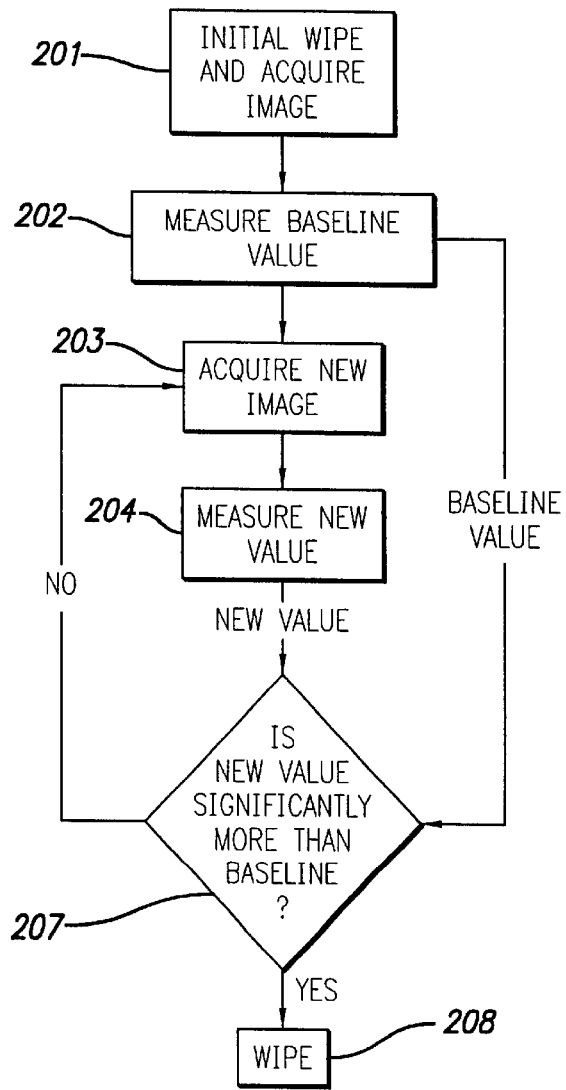
FIG. 8 is a flowchart illustrating moisture detection logic for a rain sensor in accordance with a third embodiment of the present invention.

The speed of the vehicle is a second factor affecting the operating parameters of the sensor. In accordance with an embodiment of the present invention, the sensor operates in a relative mode when the vehicle is not moving (or has a velocity of approximately zero miles per hour). FIG. 8 is an algorithm flowchart illustrating the moisture detection logic of the relative mode. In the relative mode, the threshold value used for determining whether to wipe is not a fixed value pre-selected by the user. Rather, the threshold value is determined in step 202 as a function of a baseline measurement of the average value of the square pixel difference in the ROI. Specifically, immediately upon switching to the relative mode, the sensor measures the brightness values of each pixel of the acquired optical image 201 just after a wipe cycle completes (the values of pixels typically range between 0 and 255, 0 being completely dark and 255 being completely bright). The microprocessor circuitry 22 in step 202 then calculates the average difference between the adjacent pixels. The calculated average difference constitutes a baseline value against which future calculations of average differences are compared against. If the value of future average differences exceeds the baseline average by a certain percentage as determined in decision block 207 (preferably between five to thirty percent, depending on the initial baseline value, with higher initial baseline values requiring greater percentage changes), then the sensor sends a signal 208 that will activate the windshield wipers. If the future average differences no longer exceeds the baseline value by the threshold percentage, then the sensor sends a signal 208 to disable the windshield wipers and in step 203 acquires a new optical image for purposes of measuring a new baseline value in step 204.

The sensor switches back to the absolute mode in the event that the vehicle speed is substantially greater than zero miles per hour. In one embodiment, the user can adjust the system sensitivity by varying the required percentage increase in average pixel differences.

In accordance with another embodiment of the present invention, background image removal or control can be used to detect moisture within the ROI that has a moving background (such as the road ahead of the moving vehicle). Specifically, for a given moving background with a known gray scale level or color for background, images of the moving background can be identified and removed from the optical image processing. In particular, as the measurement of values occur primarily in a vertical direction of the image, the sensor can measure the edge contrast in a vertical manner and separate a moving background image (such as a road passing by) from the stationary images. Anticipation of known structures in the road, such as lane markings, can be beneficial for removing the moving background from the optical imaging process.

It should be noted that the present invention may be embodied in forms other than the preferred embodiments described above without departing from the spirit or essential characteristics thereof. The preferred embodiments are therefore to be considered in all respects as illustrative and not restrictive, and all changes or alternatives that fall within the meaning and range of equivalency of the claims are intended to be embraced within. For example, windshield wiper control of an automobile has been illustrated to show an embodiment of the present invention, but it should be apparent that the inventive concepts described above would be equally applicable to other vehicles such as boats or airplanes, or other wiper controls such as headlight wipers. Accordingly, the scope of the invention is intended to be limited and/or defined only by the proper interpretation of the following claims.

What we claim:

1. A moisture sensor for detecting moisture on a vehicle windshield, said sensor comprising:
   a housing;
   microprocessor circuitry dispensed within said housing; and
   an optical image detector connected to said microprocessor circuitry, said optical image detector capable of digitizing and transferring video frames of the windshield and a background scene viewed through the windshield to said microprocessor circuitry, wherein said microprocessor circuitry processes said video frames to select a portion of the video frame, corresponding to a predetermined portion of the background for moisture detection processing.

2. The sensor of claim 1, further comprising a communication bus, said communication bus connected between said microprocessor circuitry and said vehicle.

3. The sensor of claim 1, wherein said optical image detector is a digital camera.

4. The moisture sensor of claim 1, wherein said selected portion of the video frame comprises the vehicle hood.

5. The moisture sensor of claim 4, wherein the vehicle hood is selected during daylight.

6. The moisture sensor of claim 1, wherein said selected portion of the video frame comprises the road ahead of the vehicle.

7. The moisture sensor of claim 6, wherein the road ahead of the vehicle is selected during nighttime.

8. A moisture sensor for detecting moisture on a vehicle windshield, said sensor comprising:
   an optical image detector, said optical image detector capable of digitizing and transferring video frames of the vehicle windshield and a background scene viewed through the windshield; and
   circuitry connected to said optical image detector, comprising:
      means for acquiring an optical image from a region of interest;
      means for determining the brightness of ambient lighting surrounding the vehicle;
      means for selecting a daylight processing algorithm based on an ambient lighting corresponding to daylight or a nighttime processing algorithm based on an ambient lighting corresponding to nighttime;
      means for processing the acquired optical image using the selected algorithm to determine the presence of moisture on the vehicle windshield.

9. A method of detecting moisture on a vehicle windshield, said method comprising:
   acquiring an optical image from a region of interest including an image of the vehicle windshield;
   determining the brightness of ambient lighting surrounding the vehicle;
   selecting a daylight processing algorithm based on an ambient lighting corresponding to daylight or a nighttime processing algorithm based on an ambient lighting corresponding to nighttime; and
   processing the acquired optical image using the selected algorithm to determine the presence of moisture on the vehicle windshield.

10. The method of claim 9, further comprising sending a signal to said vehicle, said signal causing activation of a windshield wiper of said vehicle.

11. The method of claim 9, wherein said nighttime processing algorithm comprises the step of measuring an average value of the square of differences between adjacent pixels of said optical image.

12. The method of claim 9, wherein said daytime or nighttime processing algorithm comprises measuring anyone of a correlation of adjacent pixels of said optical image, a contrast of gray scale levels within said optical image, a brightness dispersion of said optical image, a color variance of said optical image, an average strength of edges of images within said optical image, a standardized block variance of said optical image, a block pixel variation of said optical image, and an aberration in said optical image.

13. The method of claim 19, further comprising ignoring a portion of said optical image if a windshield wiper of said vehicle is physically moving.

14. The method of claim 9, wherein said daylight processing algorithm comprises measuring an average value of image complexity of said optical image.

15. The method of claim 14, wherein said measuring an average value of image complexity includes measuring the approximate bandwidth of a signal from said optical image.

16. The method of claim 14, wherein said measuring an average value of image complexity includes measuring the bit information of a pixel of said optical image.

17. A method of detecting moisture on a vehicle windshield, said method comprising:
   acquiring an optical image from a region of interest including at least a portion of the windshield and a portion of a background image viewed through the windshield;
   measuring the brightness values of pixels of said optical image;
   calculating the average difference of brightness between adjacent pixels of said optical image; and
   calculating the average image complexity of pixels of said optical image.

18. The method of claim 17, further comprising sending a signal that causes a windshield wiper of said vehicle to activate.

19. The method of claim 17, further comprising sending a signal that disables a windshield wiper of said vehicle.

20. The method of claim 17, wherein measuring the brightness values of each pixel is performed only when a windshield wiper of said vehicle is in a rest position.

21. The method of claim 20, further comprising measuring a baseline value of average differences between said adjacent pixels of said optical image.

22. A method of detecting moisture on a vehicle windshield, said method comprising:
   acquiring an optical image including the windshield and an image viewed through the windshield, including a background image and a region of interest;
   removing the background image of said optical image; and
   performing image processing to detect moisture on the windshield using the image with the background removed.

23. The method of claim 22, wherein said step of removing background image comprises:
   measuring an edge contrast of said optical image; and
   separating a moving background image from stationary images.

24. A method of detecting moisture on a vehicle windshield, said method comprising:
   acquiring an optical image from a region of interest including at least a portion of the windshield and a background image viewed through the windshield;
   measuring the brightness values of pixels of said optical image;
   calculating the average image complexity of pixels of said optical image;
   calculating an additional image feature; and
   determining if moisture is present on the vehicle windshield employing the image complexity and said additional feature.

25. The method of claim 24, wherein measuring an average value of image complexity includes measuring the approximate bandwidth of a signal from said optical image.

26. The method of claim 24, wherein calculating an additional image feature comprises measuring anyone of a correlation of adjacent pixels of said optical image, a contrast of gray scale levels within said optical image, a brightness dispersion of said optical image, a color variance of said optical image, an average strength of edges of images within said optical image, a standardized block variance of said optical image, a block pixel variation of said optical image, and an aberration in said optical image.

27. A method of detecting moisture on a vehicle windshield, said method comprising:
   acquiring an optical image from a region of interest including at least a portion of the windshield and a background image viewed through the windshield;
   measuring the brightness values of pixels of said optical image;
   calculating the run length statistics of brightness of pixels of said optical image;

calculating an additional image feature; and determining if moisture is present on the vehicle windshield employing the run length statistics of pixel brightness and said additional feature.

28. The method of claim 27, wherein measuring an average value of image complexity includes measuring the approximate bandwidth of a signal from said optical image.

29. The method of claim 27, wherein calculating an additional image feature comprises measuring anyone of a correlation of adjacent pixels of said optical image, a contrast of gray scale levels within said optical image, a brightness dispersion of said optical image, a color variance of said optical image, an average strength of edges of images within said optical image, a standardized block variance of said optical image, a block pixel variation of said optical image, and an aberration in said optical image.

* * * * *